United States Patent [19]

Bunge et al.

[11] Patent Number: 4,675,946
[45] Date of Patent: Jun. 30, 1987

[54] TROMMEL EVISCERATOR

[75] Inventors: Daniel C. Bunge; James J. Cooper, both of Merritt Island; Fred A. Willshier, Cape Canaveral, all of Fla.; Edward F. Silchenstedt, Rockport, Tex.

[73] Assignee: Southern Seafoods, Cape Canaveral, Fla.

[21] Appl. No.: 830,380

[22] Filed: Feb. 18, 1986

[51] Int. Cl.⁴ .............................................. A22C 29/04
[52] U.S. Cl. .................................. 17/45; 17/53; 17/73
[58] Field of Search ................... 17/45, 46, 53, 66, 73

[56] References Cited

U.S. PATENT DOCUMENTS

| | | | |
|---|---|---|---|
| 2,608,716 | 9/1952 | Harris | 17/74 X |
| 2,617,532 | 11/1952 | Gorton | 209/247 |
| 2,827,383 | 3/1958 | Gorton | 99/194 |
| 3,129,456 | 4/1964 | Renfroe | 17/45 |
| 3,177,522 | 4/1965 | Renfroe | 17/2 |
| 3,180,158 | 4/1965 | Morris | 74/26 |
| 3,257,684 | 6/1966 | Wenstrom | 17/45 |
| 3,434,586 | 3/1969 | Morris | 198/220 |
| 3,528,124 | 9/1970 | Wenstrom | 17/48 |
| 3,562,855 | 2/1971 | Willis | 17/48 |
| 3,619,855 | 11/1971 | Willis | 17/74 |
| 3,662,431 | 5/1972 | Willis | 17/48 |
| 3,662,432 | 5/1972 | Wenstrom | 17/53 |
| 3,665,554 | 5/1972 | Wenstrom | 17/45 |
| 3,665,555 | 5/1972 | Willis | 17/53 |
| 3,683,458 | 8/1972 | Wenstrom | 17/74 |
| 3,864,788 | 2/1975 | Willis | 17/53 |
| 3,945,084 | 3/1976 | Willis | 17/73 |
| 4,485,526 | 12/1984 | Opanasenko | 17/74 X |

Primary Examiner—Willie G. Abercrombie
Attorney, Agent, or Firm—Arnold, White & Durkee

[57] ABSTRACT

An eviscerator is provided with a plurality of rollers which are arranged to form a generally cylindrical trommel. The rollers are designed such that alternating rollers rotate in opposite directions. Additionally, the trommel is designed so that it can rotate within a supporting frame. A first end of the trommel is elevated so as to cause scallops to spirally progress through the eviscerator.

14 Claims, 4 Drawing Figures

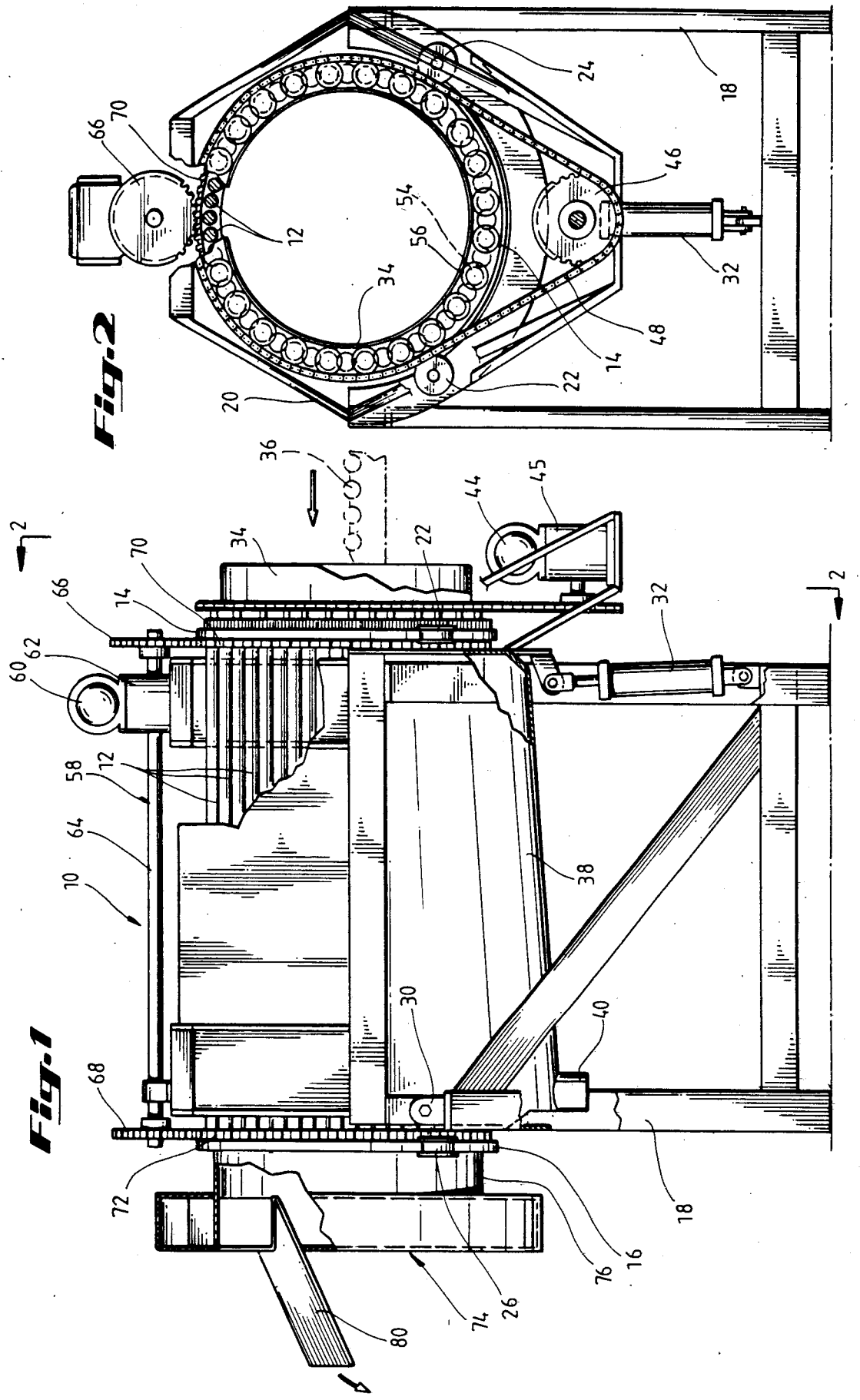

4,675,946

1

TROMMEL EVISCERATOR

BACKGROUND OF THE INVENTION

The present invention relates to an apparatus and method for preparing shellfish for consumption. More particularly, the invention relates to an apparatus and method for eviscerating shellfish such as scallops.

In order to prepare shellfish for human consumption, it is necessary to remove and clean the edible portion of the shellfish. With bi-valves such as scallops, the edible portion comprises the adductor muscle which opens and closes the shells. Various methods have been devised for separating the shells of bi-valves and dislodging the adductor muscle therefrom. Several such methods are disclosed in U.S. Pat. No. 3,528,124 to Wenstrom, et al. These methods generally comprise shocking the shellfish by striking it against an immovable object, heating the shellfish for a time sufficient to separate the adductor muscle from the shells but not so long as to cook the muscle, and shocking the shellfish a second time against an immovable object to separate the shells and the adductor muscle.

Once the adductor muscle has been separated from the shells, further processing is still required before it is suitable for consumption. The viscera of the shellfish surrounds the adductor muscle and generally must be removed before the muscle is cooked. One of the challenges faced in removing the viscera is to completely remove the viscera without removing any significant portion of the edible meat. Additionally, inasmuch the scallops are relatively small, it is important to quickly and efficiently remove the viscera in order to make the process economical.

U.S. Pat. No. 3,257,684 to Wenstrom, et al. discloses a method and apparatus for separating the viscera from the adductor muscle of the scallop. In the device disclosed in that patent, the adductor muscle with the viscera attached thereto is placed over an opening in a support, such opening being about the same size as the muscle to be cleaned. The muscle is then forced through the opening to shear the viscera from the muscle. In one embodiment disclosed in the patent, the muscle is forced through the opening with a rod after the muscle is aligned with the opening by hand. In another embodiment, a provision is made for holding the viscera about the opening while the aligned muscle is forced through the opening. Other embodiments include means for forcing the muscle through the opening by differential pressure, such as by a vacuum in one instance or by positive air pressure or by hydraulic pressure in another instance.

U.S. Pat. No. 3,129,456 to Renfroe discloses an automatic process and apparatus for eviscerating scallops. In this process, a generally cylindrical viscera bearing scallop muscle is fed in an axial direction into the apparatus where the viscera is severed from the muscle. The severing is performed by a pair of cutting elements relatively moveable in cooperative shearing relationship. In one embodiment, a knife is moved across the face of a perforated wall in conformity therewith to affect a shearing action between the knife and the edges of the perforations. The perforations are too small to permit passage of the muscles but the viscera moves freely through the perforations to be discharged. Suction can be applied to the opposite side of the perforated wall to facilitate severance and removal of the viscera. The muscles are rotated about their axes until all of the viscera is removed.

A further apparatus and method for eviscerating scallops is disclosed in U.S. Pat. No. 3,562,855 to Willis. In this process, scallop muscles and attached viscera are positioned on the upper surface of an inclined path formed by a plurality of horizontal rollers. Viscera is pulled from the scallop muscle through the nip formed by adjacent rollers by rotating the upper portion of adjacent rollers toward each other. The attached viscera is cleaned from the rollers below the inclined path. The advance of the scallop muscles down the path is controlled by intermittently rotating the upper portion of adjacent rollers away from each other to permit the lower of the adjacent rollers to advance the muscle down the path and by spraying a flow of fluids, such as water on at least some of the muscles on the path to effect the rate of movement down the path.

Still another method and apparatus for eviscerating scallops is disclosed in U.S. Pat. No. 3,665,554. In this process, the adductor muscles and attached viscera are delivered to an elongated stationary expanded metal plate. The plate is perforated and has an undulated irregular surface providing closely spaced projections. A plurality of spaced, flexible pusher plates cooperate with the perforated metal plate to remove the viscera from the adductor muscles as they are pushed along the plate. As the muscle and viscera are advanced, the viscera tends to fall through the openings in the plate and portions of the viscera are caught and pinched by the edge of the pusher plate against the projections of the metal plate.

The '554 patent discloses a second method and apparatus for eviscerating scallops in which a series of contiguous rollers are geared together so that adjacent rollers rotate in opposite directions. The rollers are rotated in one direction for about 1½ seconds and then are reversed in direction for about 1½ seconds. The rollers are formed from metal and have an embossed plastic covering of a nature such as to grip the viscera without damage to the scallop meat.

The '554 patent discloses a further method and apparatus for eviscerating scallops in which the contiguous rollers are arranged to be rotated in the same direction with our without reversal. The rollers can have either smooth or embossed surfaces. Alternating rollers are arranged to rotate at about 20% more speed than the other rollers. Accordingly, as the scallop meat is deposited between a pair of rollers, the faster rotating roller pulls the viscera against the frictional resistance of the slower moving roller to tear the viscera away from the scallop muscle and passes the viscera downwardly between the two rollers. The slower rotating roller can then advance the scallop meat down the bed of rollers where further viscera is removed.

While each of these processes provides a means for removing the viscera from the edible adductor muscle, they are still plagued with certain problems. For example, in the automatic processes which utilize a series of rollers, the bed of rollers generally has to be inclined to provide a driving force to move the scallops along the bed. However, it is still common for scallops to become stuck in a nip between a pair of rollers such that the scallops do not progress down the eviscerating apparatus. Accordingly, what is needed in the art is a method and apparatus for eviscerating scallops which includes a reliable means for propelling the scallops along the length of the apparatus. Such an apparatus and method are disclosed and claimed herein.

SUMMARY OF THE INVENTION

The present invention provides a new apparatus and method for eviscerating scallops and other shellfish. In a preferred embodiment, the apparatus comprises a plurality of axially aligned rollers which are mounted between a pair of rims so as to form the sides of a cylindrical drum or trommel. A drive mechanism is provided for causing alternating rollers to rotate in opposite directions. The rollers are covered with an embossed surface such as friction tape which allows adjacent rollers to grip the viscera and pull it from the adductor muscle.

Scallops are fed into a first end of the eviscerator where processing begins. A second drive mechanism is provided to rotate the rims causing the cylindrical trommel to revolve. Additionally, the first end of the trommel is elevated with respect to the second end. Accordingly, as the trommel rotates the scallops spirally progress down the length of the eviscerator.

A collection tray is positioned below the trommel for receiving the viscera which have been removed. The viscera are discharged from the tray for disposal.

A discharge mechanism is positioned at the second end of the trommel for removing the scallops. In the preferred embodiment, the discharge mechanism includes a ring which is mounted to rotate with the trommel. A plurality of angled plates or buckets are formed on the inner surface of the ring to collect the scallops and lift them to the top of the rotating ring. At this point, the scallops are free to fall from the plates into a discharge chute so that they can be transferred for further processing.

BRIEF DESCRIPTION OF THE DRAWINGS

FIG. 1 is a partially broken away side plan view illustrating the preferred embodiment of the present invention.

FIG. 2 is an end plan view of the embodiment of FIG. 1 illustrating the inlet and the drive mechanism for the rollers.

DETAILED DESCRIPTION OF THE PREFERRED EMBODIMENT

The present invention relates to a new apparatus and method for eviscerating scallops. The apparatus is best understood by reference to the drawings in which like parts are designated with like numerals throughout.

Referring first to FIG. 1, a preferred embodiment of eviscerator 10 is illustrated in a partially broken away side plan view. Eviscerator 10 includes a plurality of rollers 12 which are mounted in rims 14 and 16 to form a generally cylindrical trommel 15.

Figure 4:
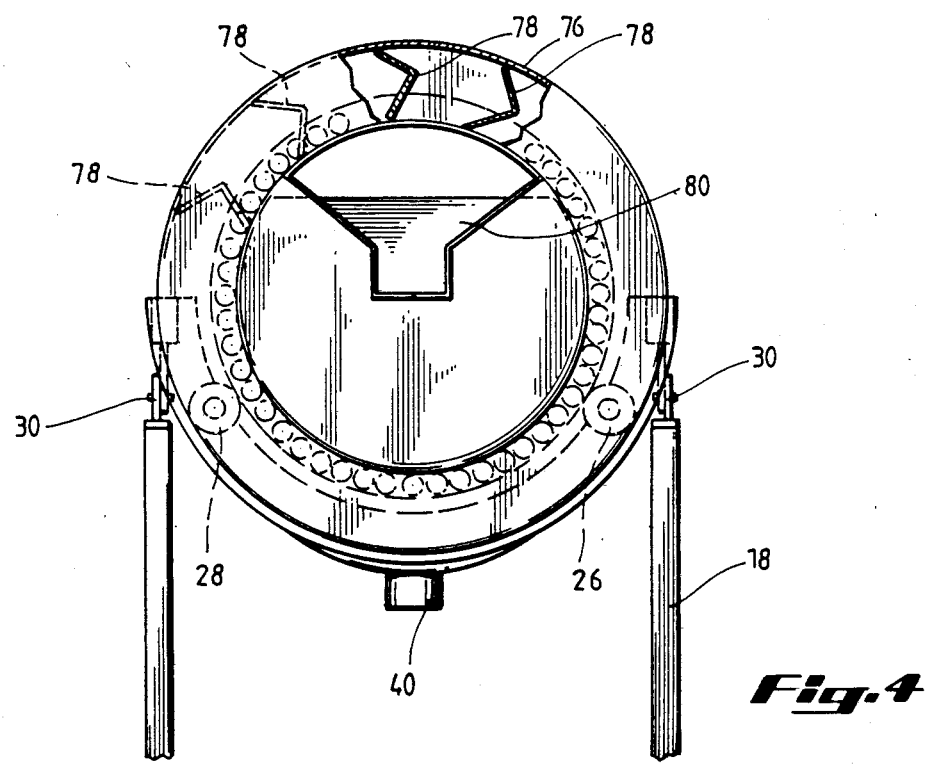
FIG. 4 is an end plan view of the discharge end of the embodiment of FIG. 1.

Eviscerator 10 includes a base 18 which supports a frame 20 within which rims 14 and 16 are mounted. Rollers 22 and 24 are mounted in a first end of frame 20 and support rim 14 (see FIG. 2). Rim 14 is free to rotate on rollers 22 and 24. A second pair of rollers 26 and 28 (see FIG. 4) are mounted on the second end of frame 20 for supporting rim 16.

Frame 20 is connected to base 18 by hinges 30 at the second end. The first end of frame 20 is supported by base 18 through a hydraulic cylinder 32. Hydraulic cylinder 32 is designed such that it can raise the first end of the cylindrical trommel 15 with respect to the second end so as to form an incline which allows the scallops to progress through the trommel under the influence of gravity as more fully discussed hereinafter.

In the preferred embodiment, the end of eviscerator 10 which includes hydraulic cylinder 32 acts as the receiving end where scallops are introduced. This end includes a ring 34 through which the scallops are introduced by a conveyor 36 or by any other suitable means. Ring 34 prevents scallops from becoming embedded in the drive mechanisms discussed hereinafter.

The viscera are removed from the adductor muscle of the scallops by rollers 12. In the preferred embodiment, alternating rollers are designed to rotate in opposite directions. Accordingly, the viscera is pinched in the nip between adjacent rollers and pulled from the adductor muscle. The viscera passes from the inside of the cylindrical trommel 15 to the outside where it is free to fall into a tray 38 positioned in frame 20 beneath the rollers. Tray 38 is inclined and includes a discharge chute 40 through which the viscera can be flushed for disposal.

A roller drive mechanism 42 is provided for rotating rollers 12. Drive mechanism 42 includes a motor 44, a gear box 45, drive gear 46 (see FIG. 2) and a drive chain 48 which rotates the rollers.

Figure 3:
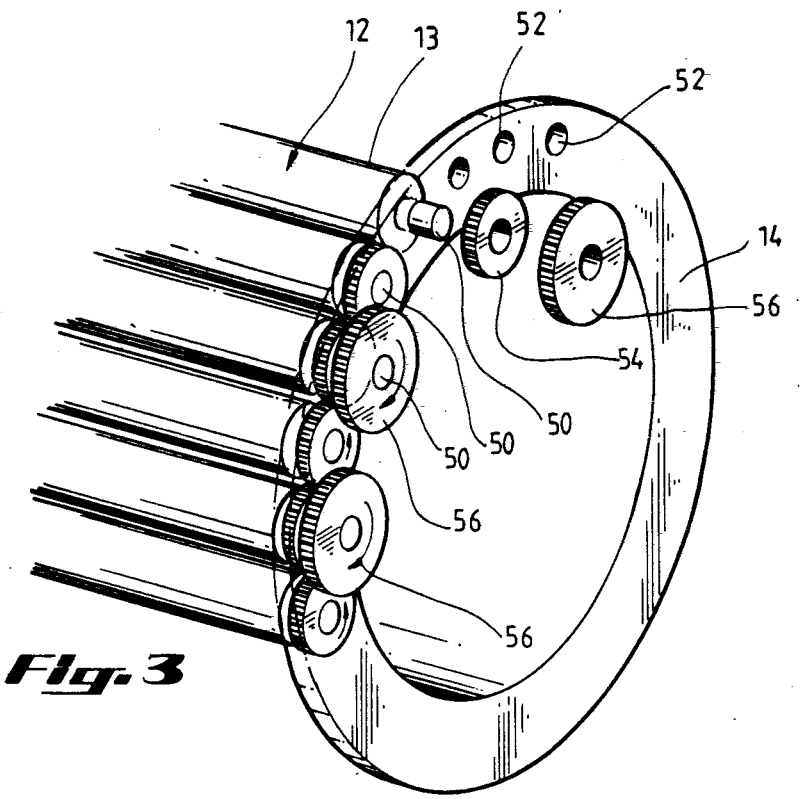
FIG. 3 is a perspective illustration of the roller ends illustrating the drive gears.

Reference is next made to FIG. 3 to illustrate the roller configuration and the method by which they are turned. Each roller 12 includes a central shaft 50 which passes through a bore 52 in rim 14. Shafts 50 are suitably supported within bores 52 such that they can rotate freely. In one embodiment, shafts 50 are supported by bearings within rim 14. The other ends of shafts 50 are supported to freely rotate within rim 16.

A gear wheel 54 is placed on each shaft 50 adjacent rim 14 and is secured in place by a pin or other suitable fastening means. Gear wheels 54 are designed to interlock with the gear wheels on adjacent rollers. As any given roller rotates in one direction, the two rollers immediately adjacent to it will rotate in the opposite direction. Accordingly, alternating rollers in the cylindrical trommel 15 will rotate in opposite directions.

A sprocket 56 is placed on shaft 50 of alternating rollers 12 adjacent gear wheel 54. Sprockets 56 engage drive chain 48 which causes them to rotate. As can be seen in FIG. 2, at any given time, approximately two-thirds of the sprockets 56 are engaged by drive chain 48. However, because of the interlocking nature of gear wheels 54, all of the rollers are continuously turned.

Shafts 50 of rollers 12 are covered along their length between rims 14 and 16 with a suitable coating 13 to grip viscera. In one preferred embodiment, coating 13 is formed from plastic friction tape wound on shafts 50.

Referring again to FIG. 1, a drive mechanism 58 is provided to rotate the cylindrical trommel 15. Drive mechanism 58 includes a motor 60 and a gear box 62 connected to a drive shaft 64. Positioned on each end of drive shaft 64 are gear wheels 66 and 68. Gear wheels 66 and 68 engage suitable gears 70 and 72 respectively on rims 14 and 16. In a preferred embodiment, gears 70 and 72 are formed from a drive chain which is securely fastened to rims 14 and 16. Drive mechanism 58 is mounted on the top of frame 20.

A discharge mechanism 74 is mounted on the second end of eviscerator 10. Discharge mechanism 74 includes a ring 76 which is mounted on rim 16 such that it rotates therewith. Mounted on the inside of ring 76 are a plurality of angled plates 78. Angled plates 78 act as buckets to scoop the scallops as they exit from eviscerator 10 and lift them to the top of the trommel. A chute 80 is positioned in the top of discharge mechanism 74 to receive the scallops as they fall from angled plates 78. The scallops then fall down the chute 80 to a conveyor or other suitable means to transport them for further processing.

In the preferred embodiment, a spray bar (not shown) can be extended along the axis of the cylindrical trommel 15 to spray a mist of water which helps lubricate the rollers and scallops as they are being processed. Additionally, a spray bar can be positioned between tray 38 and the cylindrical trommel to wash the viscera from the rollers 12 and flush them down through chute 40.

In operation, shucked scallops are fed by conveyor 36 into the first end of eviscerator 10. Motor 44 is driving drive chain 48 which causes rollers 12 to be continuously turning with alternating rollers turning in opposite directions. Accordingly, as the scallops are dumped into eviscerator 10, the viscera is pinched in the nip between the rollers and pulled from the adductor muscle.

Simultaneous with the rotating of rollers 12, drive mechanism 58 causes the entire cylindrical trommel 15 to rotate. Since the inlet end of the eviscerator is elevated higher than the outlet end, the scallops tend to spiral through the eviscerator as the trommel rotates. Accordingly, each adductor muscle comes in contact with the rotating rollers several times during the process to insure that all of the viscera is removed. The speed of rotation of trommel 15 and the amount of elevation can be adjusted to vary the residence time of the scallops within the eviscerator to ensure that all viscera is removed.

As the scallops reach the second end of the eviscerator, they fall from the rollers into ring 76 where they are scopped up by angled plates 78 and carried to the top of the eviscerator. At this point, the orientation of plates 78 is such that the scallops fall from the plates onto chute 80 where they are discharged from the eviscerator.

A can be seen from the foregoing, the present invention provides a unique apparatus and method for eviscerating scallops and other shellfish. The trommel configuration insures that the scallops progress through the eviscerator without becoming stuck such as they do on some prior art planar eviscerators.

While the invention has been described with respect to the presently preferred embodiment, it will be appreciated that numerous modifications and changes could be made thereto without departing from the spirit or essential characteristics of the invention. Accordingly, the described embodiment is to be considered in all respects only as illustrative and not restrictive. The scope of the invention is, therefore, indicated by the appended claims rather than by the foregoing description and all modifications or changes which come within the meaning and range of equivalency of the claims are to be embraced within their scope.

What is claimed:

1. An apparatus for eviscerating scallops comprising: a base; a frame mounted on said base, said frame including a plurality of rollers mounted longitudinally therein means for rotating said rollers; and means for rotating said trommel.

2. An apparatus for eviscerating scallops as defined in claim 1 wherein said trommel comprises a first and a second rim into which said rollers are mounted.

3. An apparatus for eviscerating scallops as defined in claim 1 further including means for elevating a first end of said frame.

4. An apparatus for eviscerating scallops as defined in claim 3 wherein said elevating means comprises a hydraulic cylinder connecting a first end of said frame with said base and a hinge connecting a second end of said frame with said base.

5. An apparatus for eviscerating scallops as defined in claim 1 wherein said rollers are arranged in pairs with the rollers in each pair rotating in opposite directions.

6. An apparatus for eviscerating scallops as defined in claim 1 wherein said means for rotating said rollers comprises a motor, a drive chain, and a sprocket on alternating rollers.

7. An apparatus for eviscerating scallops as defined in claim 1 wherein said means for rotating said trommel comprises a motor connected to a gear wheel which engages a gear on each end of said trommel.

8. An apparatus for eviscerating scallops as defined in claim 1 further comprising a discharge mechanism having a ring positioned on a second end of said trommel, said ring havingn a plurality of angled plates mounted therein for lifting scallops to essentially the top of said ring where the scallops are dumped into a discharge chute.

9. An apparatus for eviscerating scallops comprising:
a base;
a frame mounted on said base, said frame including first and second rims supported in opposite ends thereof;
a plurality of rollers extending between said rims so as to form a generally cylindrical trommel;
a motor for rotating said rollers within said rims;
a motor for rotating said rims with respect to said frame so as to cause said trommel to rotate; and
means for elevating a first end of said trommel.

10. An apparatus for eviscerating scallops as defined in claim 9, wherein alternating rollers are rotated in opposite directions.

11. An apparatus for eviscerating scallops are defined in claim 9, wherein said elevating means comprises a hydraulic cylinder, a first end fo said frame with said base and a hinge connecting a second end of said frame with said base.

12. An apparatus for eviscerating scallops as defined in claim 9, further comprising a tray positioned in said frame beneath said cylindrical trommel.

13. An apparatus for eviscerating scallops as defined in claim 9, further comprising a discharge mechanism having a ring connected to the rim at a second end of said trommel, said rim including a plurality of buckets mounted therein for lifting scallops to essentially the top of said ring where the scallops are dumped into a discharge chute.

14. A method for eviscerating scallops comprising the steps of:
feeding scallops into an elevated end of a trommel eviscerator having a plurality of rollers;
rotating alternating rollers in opposite directions to pinch viscera and remove it from adductor muscles; and
rotating said trommel to cause the scallops to travel through said eviscerator.

* * * * *

UNITED STATES PATENT AND TRADEMARK OFFICE
CERTIFICATE OF CORRECTION

PATENT NO. : 4,675,946

DATED : June 30, 1987

INVENTOR(S) : Daniel C. Bunge et al.

It is certified that error appears in the above-identified patent and that said Letters Patent are hereby corrected as shown below:

Column 5, line 66, after "therein" add to form a general cylindrical trommel;.
Column 5, line 67, "means for rotating said roller; and" should be flush left margin.
Column 6, line 26, "havingn" should read --having--.
Column 6, line 44, "are" should read --as--.
Column 6, line 46, "fo" should read --of--.

Signed and Sealed this

First Day of December, 1987

Attest:

DONALD J. QUIGG

Attesting Officer

Commissioner of Patents and Trademarks